United States Patent
Lee et al.

(10) Patent No.: US 11,171,919 B1
(45) Date of Patent: Nov. 9, 2021

(54) WEB ATTACK DETECTING AND BLOCKING SYSTEM AND METHOD THEREOF

(71) Applicant: F1 SECURITY INC., Seoul (KR)

(72) Inventors: In Young Lee, Gyeonggi-do (KR); Dae Ho Lee, Gyeonggi-do (KR); Sung Su Choi, Gyeonggi-do (KR); Young Suk Hwang, Seoul (KR); Dong Geun Lee, Gyeonggi-do (KR); Ki Hwan Kim, Gyeonggi-do (KR)

(73) Assignee: F1 SECURITY INC., Seoul (KR)

( * ) Notice: Subject to any disclaimer, the term of this patent is extended or adjusted under 35 U.S.C. 154(b) by 283 days.

(21) Appl. No.: 16/492,390

(22) PCT Filed: Oct. 11, 2018

(86) PCT No.: PCT/KR2018/011981
§ 371 (c)(1),
(2) Date: Sep. 9, 2019

(87) PCT Pub. No.: WO2019/231057
PCT Pub. Date: Dec. 5, 2019

(30) Foreign Application Priority Data

Jun. 1, 2018 (KR) .................. 10-2018-0063747

(51) Int. Cl.
*H04L 29/06* (2006.01)
(52) U.S. Cl.
CPC ...... *H04L 63/0236* (2013.01); *H04L 63/0227* (2013.01); *H04L 63/1416* (2013.01); *H04L 63/1433* (2013.01); *H04L 63/306* (2013.01)

(58) Field of Classification Search
CPC ............. H04L 63/0236; H04L 63/0227; H04L 63/1433; H04L 63/306; H04L 63/1416
See application file for complete search history.

(56) References Cited

U.S. PATENT DOCUMENTS

| 10,044,675 B1 * | 8/2018 | Ettema ................ H04L 63/1491 |
| 2006/0080735 A1 * | 4/2006 | Brinson ................ G06F 21/554 |
| | | 726/22 |

(Continued)

FOREIGN PATENT DOCUMENTS

| KR | 10-2004-0042490 A | 5/2004 |
| KR | 10-2009-0076556 A | 7/2009 |

(Continued)

*Primary Examiner* — Cheng-Feng Huang
(74) *Attorney, Agent, or Firm* — The PL Law Group, PLLC

(57) ABSTRACT

A system for detecting and blocking a web attack includes a filter unit receiving web request data from a user terminal, and controlling a web application to maintain a standby state, and a web firewall daemon receiving the web request data from the filter unit and determining a risk by analyzing the web request data and transmitting the resulting risk to the filtering unit. A method of detecting and blocking a web attack includes receiving web request data from a user terminal, controlling a web application to maintain a standby state, transmitting the web request data to a web firewall daemon, determining a risk by analyzing the web request data, and transmitting the risk of the web request data to the filtering unit. Embodiments of the present invention can provide customer customized web security service without affecting the stability and the availability of the web application.

5 Claims, 2 Drawing Sheets

(56) References Cited

U.S. PATENT DOCUMENTS

| | | | |
|---|---|---|---|
| 2011/0225647 A1* | 9/2011 | Dilley | H04L 63/0218 726/14 |
| 2011/0283359 A1* | 11/2011 | Prince | H04L 61/2007 726/23 |
| 2015/0020188 A1* | 1/2015 | Segal | H04L 63/0245 726/13 |
| 2015/0244678 A1* | 8/2015 | Stevens, IV | H04L 67/10 726/23 |
| 2017/0353496 A1* | 12/2017 | Pai | H04L 63/1416 |
| 2018/0139179 A1* | 5/2018 | Ettema | G06F 21/602 |

FOREIGN PATENT DOCUMENTS

| | | |
|---|---|---|
| KR | 10-2010-0058695 A | 6/2010 |
| KR | 10-1005927 B1 | 1/2011 |
| KR | 10-1625338 B1 | 5/2016 |

\* cited by examiner

WEB ATTACK DETECTING AND BLOCKING SYSTEM AND METHOD THEREOF

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/011981, filed Oct. 11, 2018, which claims priority to the benefit of Korean Patent Application No. 10-2018-0063747 filed in the Korean Intellectual Property Office on Jun. 1, 2018, the entire contents of which are incorporated herein by reference.

TECHNICAL FIELD

The present invention relates to web attack detecting and blocking that detect and block web application attacks through a web server providing web services. More particularly, the present invention relates to a system for detecting and blocking a web attack, and a method thereof, the system and method being capable of determining whether or not to block web request data by analyzing the web request data which is received in the web server.

BACKGROUND ART

As attacks through the Internet has evolved and developed day by day, attacks through normal web (ports 80 and 443) have also diversified. In addition, intelligent attack methods that continuously discover and attack function-specific vulnerabilities of web applications continue to appear.

It is difficult to handle such intelligent attack methods by using conventional general network firewalls, intrusion detect systems (IDS), and intrusion prevention system (IPS), etc.

Web services through cloud services such as AWS (Amazon web services cloud), Microsoft Azure, etc. are becoming more and more active. In addition, there is a need for effectively detecting and preventing system web attacks while removing dependencies of the underlying infrastructure while making it easy to use the system in a low cost even in a cloud environment.

In order to meet these needs, a conventional Korean Patent Application Publication No. 10-2010-0058695 (Published on Jun. 4, 2010) discloses a model based on a profile for web application attack detection and a method of selectively applying the same, but the above needs are not satisfied.

In other words, the above-described conventional technique cannot provide a customer customized web security service without affecting the stability and availability of the web application. In addition, there is a high possibility of communication delay depending on the situation of the Internet network, and the DNS information has to be changed to the service provider's IP information. Accordingly, in order to provide services through HTTPS, an SSL authentication and a personal key have to be uploaded to a web firewall service provider.

SUMMARY

Accordingly, the present invention has been made keeping in mind the above problems occurring in the prior art, and the first objective of the present invention is to provide a system for detecting and blocking a web attack, the system being capable of: providing customer customized web security service without affecting the stability and availability of the web application; providing web security service regardless of an Internet network situation; providing easy installation, update, and version upgrade of software; providing security services while maintaining an existing network configuration; providing security services without changing IP and DNS information; providing preventing an SSL authentication and a personal key from being exposed and reduction in an initial cost of introduction; being applicable to a cloud server environment in a smooth manner; and being applicable to a web application security system, a web server installed in a could system, an end point of a mobile application server side, an end point of an IOT user interface, and an end point of a server side.

In addition, the second objective of the present invention is to provide a method of detecting and blocking a web attack, the method being capable of: providing customer customized web security service without affecting the stability and availability of the web application; providing web security service regardless of an Internet network situation; providing easy installation, update, and version upgrade on software; providing security services while maintaining an existing network configuration; providing security services without changing IP and DNS information; providing preventing an SSL authentication and a personal key from being exposed and reduction in the initial cost of introduction; being applicable to a cloud server environment in a smooth manner; and being applicable to a web application security system, a web server installed in a cloud system, an end point of a mobile application server side, an end point of an IOT user interface, and an end point of a server side.

In order to accomplish the above first objective, the present invention provides a system for detecting and blocking a web attack, the system including: a filter unit receiving web request data from a user terminal, and controlling a web application to maintain a standby state; and a web firewall daemon receiving the web request data from the filter unit, and determining a risk by analyzing the web request data and transmitting the resulting risk of the web request data to the filtering unit.

The filtering unit may include: a first communication module performing communication with the web firewall daemon by using the same protocol, and receiving the resulting risk of the web request data from the web firewall daemon; and a first control module controlling the first communication module to prepare for the resulting risk of the web request data.

The web firewall daemon may include: a second communication module receiving the web request data from the filtering unit; a risk determining module determining the risk by analyzing the web request data received in the second communication module; and a data changing module modifying the web request data when it is determined that the resulting risk of the web request data represents that changes in the web request data are necessary so as to generate modified web request data, wherein the second communication module may transmit the modified web request data to the filtering unit.

The filtering unit may further include: a storage module for storing the web request data and the resulting risk of the web request data, wherein the first control module may control the first communication module to prepare for the resulting risk of the web request data by using the resulting risk of the web request data stored in the storage module.

The filtering unit may further include: an information obtaining module obtaining an IP (Internet protocol) address and URL (uniform resource locator) information of the user terminal that has transmitted the web request data from the web request data, wherein the first communication module may transmit to the second communication module the IP address and the URL information of the user terminal, the IP address and the URL information being obtained in the information obtaining module, the risk determining module may determine the risk of the web request data by analyzing the IP address and the URL information of the user terminal, the IP address and the URL information being received in the second communication module, and when it is determined that the IP address and the URL information of the user terminal are not sufficient for determining the risk of the web request data, the risk determining module may generate a request for additional information, and the second communication module may transmit the request for additional information to the first communication module.

The information obtaining module may obtain additional information in association with the request for additional information from the web request data, the first communication module may transmit the additional information obtained in the information obtaining module from the web request data to the second communication module, the risk determining module may determine the risk of the web request data by analyzing the additional information received in the second communication module, and the second communication module may transmit the resulting risk of the web request data to the first communication module which is obtained by analyzing the additional information in the risk determining module.

In order to accomplish the above second objective, the present invention provides a method of detecting and blocking a web attack, the method including: receiving, by a filtering unit, web request data from a user terminal; controlling, by the filtering unit, a web application to maintain a standby state; transmitting, by the filtering unit, the web request data to a web firewall daemon; determining, by the web firewall daemon, a risk by analyzing the web request data; and transmitting, by the web firewall daemon, the risk of the web request data to the filtering unit.

The transmitting, by the web firewall daemon, of the risk of the web request data to the filtering unit may include: controlling, by a first control module, a first communication module to prepare for the risk of the web request data which is received in the first control module from the web firewall daemon.

The determining, by the web firewall daemon, of the risk by analyzing the web request data may include: modifying, by the web firewall daemon, the web request data when it is determined that the resulting risk of the web request data represents that modification on the web request data is necessary; and generating, by the web firewall daemon, modified web request data where the web request data has been modified, and the transmitting, by the web firewall daemon, of the risk of the web request data to the filtering unit may include: transmitting, by the web firewall daemon, the modified web request data to the filtering unit.

The transmitting, by the web firewall daemon, of the risk of the web request data to the filtering unit may include: storing, by the filtering unit, the web request data and the resulting risk of the web request data; and controlling, by the first control module, the first communication module to prepare for the risk of the web request data by using the stored resulting risk of the web request data.

The transmitting, by the filtering unit, of the web request data to the web firewall daemon may include: obtaining, by the filtering unit, an IP address and URL information of the user terminal that has transmitted the web request data; transmitting, by the filtering unit, the obtained IP address and the URL information of the user terminal to the web firewall daemon; determining, by the web firewall daemon, the risk of the web request data by analyzing the IP address and the URL information of the user terminal; generating, by the web firewall daemon, a request for additional information when the IP address and the URL information of the user terminal are not sufficient for determining the risk of the web request data; and transmitting, by the web firewall daemon, the request for additional information to the filtering unit.

The transmitting, by the web firewall daemon, of the request for additional information to the filtering unit may include: obtaining, by the filtering unit, additional information in association with the request for additional information from the web request data; transmitting, by the filtering unit, the additional information obtained from the web request data to the web firewall daemon; determining, by the web firewall daemon, the risk of the web request data by analyzing the additional information; and transmitting, by the web firewall daemon, the resulting risk of the web request data which is determined by analyzing the additional information to the filtering unit.

According to a system for detecting and blocking a web attack, and a method thereof of the present invention described above, first, customer customized web security service without affecting the stability and the availability of the web application can be provided.

Subsequently, second, the present invention can provide web security service regardless of an Internet network situation.

In addition, third, the present invention can provide easy installation, update, and version upgrade of software.

Subsequently, fourth, the present invention can provide security services while maintaining an existing network configuration.

In addition, fifth, the present invention can provide security services without changing IP and DNS information.

Subsequently, sixth, the present invention can prevent an SSL authentication and a personal key from being exposed, and reduce the initial cost of introduction.

In addition, seventh, the present invention can be applied to a cloud server environment in a smooth manner.

Subsequently, eighth, the present invention can be applied to a web application security system, a web server installed in a cloud system, an end point of a mobile application server side, an end point of an IOT user interface, and an end point of a server side.

DETAILED DESCRIPTION

Figure 1:
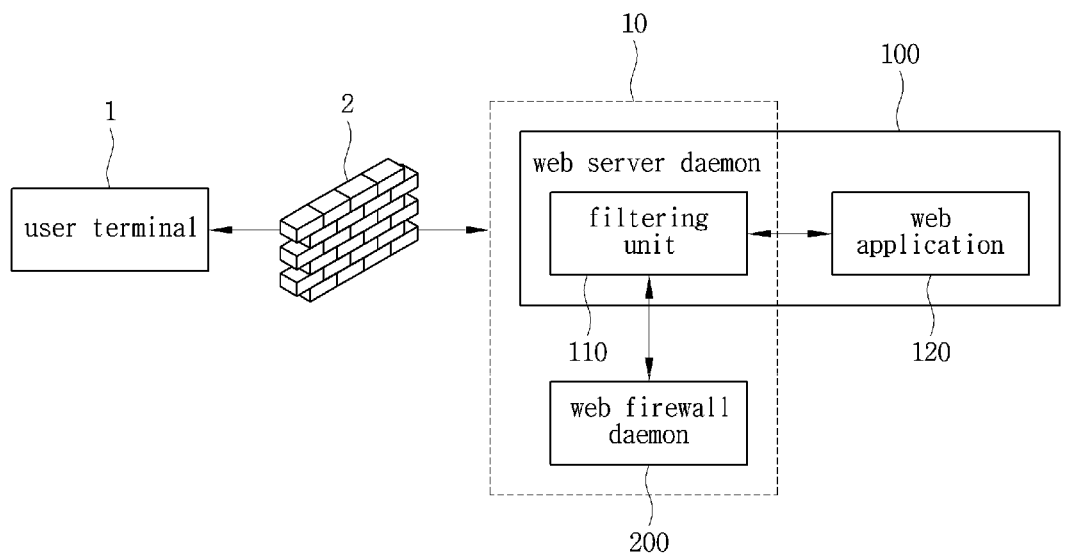
FIG. 1 is a view showing a schematic configuration of a web attack detecting and blocking system according to an embodiment of the present invention.

All terms or words used herein should not be interpreted as being limited merely to common and dictionary meanings but should be interpreted as having meanings and concepts which are defined within the technical scope of the present invention.

In the present specification, a description of a certain part "including" certain constituents means capable of further including other constituents, and does not exclude other constituents unless particularly stated on the contrary. Further, the terms " . . . unit", " . . . module", and " . . . means" described in the present specification refer to a unit for processing at least one function or operation, and may be implemented as hardware, software, or a combination thereof.

Terms used in the embodiments of the present invention will be briefly described, and the embodiments will be described in detail.

Technical and scientific teams used herein have the same meaning as commonly understood by one of ordinary skill in the art to which example embodiments of the present invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Also, terms used herein are defined to appropriately describe exemplary embodiments of the present invention and thus may be changed depending on the intent of a user or an operator, or a custom. Accordingly, the terms must be defined based on the following overall description of this specification.

In an example of the present invention, although the terms including an ordinal number such as first or second may be used to describe various elements, but the elements are not limited to these terms. These terms are used to distinguish one element from another element. For example, a first element could be termed a second element, and a second element could similarly be termed a first element without departing from the scope of the present invention. As used herein, the term "and/or" includes any and all combinations of one or more of the associated listed items.

In addition, in an example embodiment, singular expressions used herein include plural expressions unless they have definitely opposite meanings in the context.

Further, in this specification, a term "comprise" or "have" indicates presence of a characteristic, numeral, step, operation, element, component, or combination thereof described in the specification and does not exclude presence or addition of at least one other characteristic, numeral, step, operation, element, component, or combination thereof.

In an example embodiment, "a module" or "a unit" performs at least one function or operation, and may be realized as hardware, software, or combination thereof. Further, except the "modules" or "units" that have to be implemented by certain hardware, a plurality of "modules" or a plurality of "units" may be integrated into at least one module and realized as at least one processor (not illustrated).

In the example embodiments, in the case where a certain part is "connected" to the other part, it may include not only the case where the part is "directly connected" to the other part, but also the case where the part is "electrically connected" to the other part with another element interposed therebetween.

Hereinafter, embodiments of the present invention will be described in detail with reference to the accompanying drawings.

Figure 2:
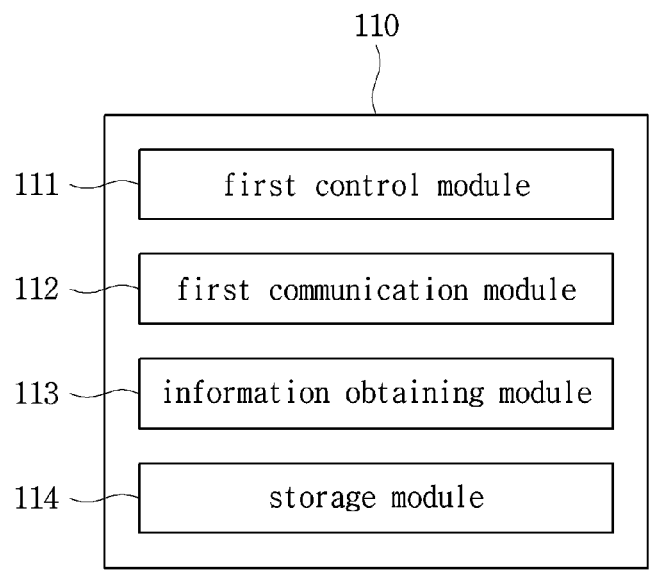
FIG. 2 is a view showing a schematic configuration of a filtering unit that is a partial configuration of the present invention.
Figure 3:
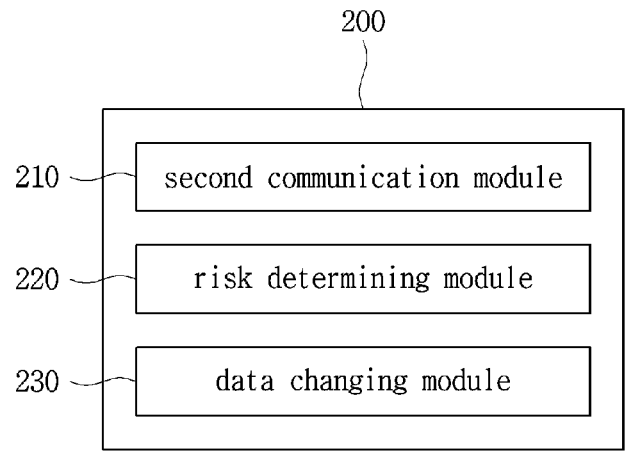
FIG. 3 is a view showing a schematic configuration of a web firewall daemon that is a partial configuration of the present invention.

FIG. 1 is a view showing a schematic configuration of a web attack detecting and blocking system according to an embodiment of the present invention, FIG. 2 is a view showing a schematic configuration of a filtering unit that is a partial configuration of the present invention, and FIG. 3 is a view showing a schematic configuration of a web firewall daemon that is a partial configuration of the present invention.

Referring to FIGS. 1 to 3, a system 10 for detecting and blocking a web attack may include a filter unit 110 and a web firewall daemon 200.

In addition, the filter unit 110 may include a first control module 111, a first communication module 112, an information obtaining module 113, and a storage module 114.

Also, the web firewall daemon 200 may include a second communication module 210, a risk determining module 220, and a data changing module 230.

The filter unit 110 may receive web request data from a user terminal 1, and control the web application 120 to maintain a standby state.

In addition, the filter unit 110 may be employed by being embedded in a web server daemon 100.

Herein, the user terminal 1 may be employed in various electric devices such as smart-phone, smart watch, smart glasses, tablet PC, laptop PC, etc.

Also, the web firewall daemon 200 may receive web request data from the filter unit 110, and determine a risk by analyzing the web request data.

The web firewall daemon 200 may transmit the resulting risk of the web request data to the filter unit 110.

Herein, the web firewall daemon 200 may be employed by being physically completely separated from the filter unit 110 that is employed by being embedded in the web server daemon 100.

Accordingly, the web application 120 is not affected even when a bug or an error occurs in the web firewall.

Accordingly, when performing updating or version upgrading on the web firewall, a function of requesting for web data, by the web server daemon 100, can be available without re-operating the web server daemon 100 and without stopping operation of the same.

The first communication module 112 and the second communication module 210 may perform communication with each other by using the same protocol.

In addition, the first communication module 112 may receive a resulting risk of a request of web data from the web firewall daemon 200.

In addition, the first control module 111 may control the first communication module 112 to prepare for the resulting risk of the web request data which is received in the first communication module 112 from the web firewall daemon 200.

In detail, the first control module 111 may control the first communication module 112 to block the corresponding web request data when it is determined that the resulting risk of the request of web data represents that blocking the web request data is reasonable.

In addition, the first control module 111 may control the first communication module 112 to transmit the corresponding web request data to the web application 120 when it is determined that the resulting risk of the web request data represents that passing the web request data is reasonable.

Also, the first communication module 112 may receive response data in association with the web request data from the web application 120.

In addition, the first communication module 112 may transmit response data in association with the web request data to the second communication module 210.

Also, the first communication module 112 may receive a resulting risk of response data determined in the risk determining module 220 from the second communication module 210.

In addition, the first control module 111 may control the first communication module 112 to prepare for the resulting risk of the response data received in the first communication module 112 from the second communication module 210.

In detail, the first control module 111 may control the first communication module 112 to block the corresponding response data when it is determined that the resulting risk of the response data represents that blocking the response data is reasonable.

In addition, the first control module 111 may control the first communication module 112 to transmit the corresponding response data to the user terminal 1 that has transmitted the web request data when it is determined that the resulting risk of the response data represents that passing the response data is reasonable.

The second communication module 210 may receive web request data from the filter unit 110.

In addition, the risk determining module 220 may determine a risk by analyzing the web request data received in the second communication module 210 from the first communication module 112.

Also, the risk determining module 220 may determine a risk by analyzing response data received in the second communication module 210 from the first communication module 112.

Herein, the risk determined in the risk determining module 220 is for determining various attack risks that may be included in web request data, response data to web request data, etc.

In detail, the risk determining module 220 may determine that changes in web request data, response data, etc. are necessary when the web request data, the response data, etc. include web attack risks based on HTTPS/HTTP v1.0, v1.1, v2, and determine that blocking of the web request data, the response data, etc. is reasonable.

Also, the risk determining module 220 may determine that web request data, response data, etc. are abnormal, when the request for the web data, the response data, etc. include a preset first reference that is at least one of an injection, a broken authentication and session management, a sensitive data exposure, an XML external entities (XXE), a broken access control, a security misconfiguration, a cross-site scripting (XSS), an insecure deserialization, a using components with known vulnerabilities, and insufficient logging & monitoring. Accordingly, the risk determining module 220 may derive a result that blocking of the web request data, the response data, etc. is reasonable, and determine that changes in the web request data, the response data, etc. are necessary.

Herein, the injection may include SQL/XQuery/XPath/LDAP injection.

Also, the risk determining module 220 may derive a result that blocking of the web request data, the response data, etc. is reasonable by using a preset first rule of at least one of rules to protect against known spammers or malicious activity (REQUEST-910-IP-REPUTATION), rules to lock down methods (PUT, PATCH, etc.) (REQUEST-911-METHOD-ENFORCEMENT), rules to protect against denial of service (DoS) attacks (REQUEST-912-DOS-PROTECTION), rules to protect against port and environment scanners (REQUEST-913-SCANNER-DETECTION), rules to protect against protocol and encoding issues (REQUEST-920-PROTOCOL-ENFORCEMENT), rules to protect against header injection, request smuggling, and response splitting (REQUEST-921-PROTOCOL-ATTACK), rules to protect against file and path attacks (REQUEST-930-APPLICATION-ATTACK-LFI), rules to protect against remote file inclusion (RFI) (REQUEST-931-APPLICATION-ATTACK-RFI), rules to protect again remote code execution (REQUEST-932-APPLICATION-ATTACK-RCE), rules to protect against PHP injection attacks (REQUEST-933-APPLICATION-ATTACK-PHP), rules for protecting against cross site scripting (REQUEST-941-APPLICATION-ATTACK-XSS), rules for protecting against SQL injection attacks (REQUEST-942-APPLICATION-ATTACK-SQLI), and rules to protect against session fixation attacks (REQUEST-943-APPLICATION-ATTACK-SESSION-FIXATION). In addition, the risk determining module 220 may determine that changes in the web request data, the response data, etc. are necessary.

In addition, when the web request data, the response data, etc. include at least one first preset reference, the risk determining module 220 may determine that changes in the web request data, the response data, etc. are necessary.

Also, the risk determining module 220 may determine a risk of the web request data, the response data, etc. by determining whether or not the web request data, the response data, etc. satisfy the PCI data security standard (PCI DSS).

In other words, the risk determining module 220 may derive a result that the web request data, the response data, etc. are normal when the web request data, the response data, etc. satisfy the PCI data security standard (PCI DSS). Also, the risk determining module 220 may derive a result that blocking of the web request data, the response data, etc. is reasonable when the web request data, the response data, etc. do not satisfy the PCI data security standard (PCI DSS), and determine that changes in the web request data, the response data, etc. are necessary.

In addition, the risk determining module 220 may derive a result that blocking of the web request data, the response data, etc. is reasonable when the web request data, the response data, etc. include a preset second reference of at least one of directory listing vulnerability, file download vulnerability, cross-site scripting vulnerability, file upload vulnerability, WebDAV vulnerability, technote vulnerability, zeroboard vulnerability, and SQL injection vulnerability, and determine that changes in the web request data, the response data, etc. are necessary.

Also, the risk determining module 220 may derive a result that blocking of the web request data, the response data, etc. is reasonable when the web request data, the response data, etc. correspond to URI file forgeries, and determine that changes in the web request data, the response data, etc. are necessary.

In addition, when the risk determining module 220 determines that changes in the web request data, by the data changing module 230, are necessary according to the resulting risk of the web request data, the data changing module 230 may modify the web request data, and generate modified web request data.

Also, modifying, by the data changing module 230, the web request data may include changes in payload of the web request data.

In addition, the data changing module 230 may modify the web request data by using the preset first rule of at least one of rules to protect against known spammers or malicious activity (REQUEST-910-IP-REPUTATION), rules to lock down methods (PUT, PATCH, etc.) (REQUEST-911-METHOD-ENFORCEMENT), rules to protect against denial of service (DoS) attacks (REQUEST-912-DOS-PROTECTION), rules to protect against port and environment scanners (REQUEST-913-SCANNER-DETECTION), rules to protect against protocol and encoding issues (REQUEST-920-PROTOCOL-ENFORCEMENT), rules to protect against header injection, request smuggling, and response splitting (REQUEST-921-PROTOCOL-ATTACK), rules to protect against file and path attacks (REQUEST-930-APPLICATION-ATTACK-LFI), rules to protect against remote file inclusion (RFI) (REQUEST-931-APPLICATION-ATTACK-RFI), rules to protect again remote code execution (REQUEST-932-APPLICATION-ATTACK-RCE), rules to protect against PHP injection attacks (REQUEST-933-APPLICATION-ATTACK-PHP), rules for protecting against cross site scripting (REQUEST-941-APPLICATION-ATTACK-XSS), rules for protecting against SQL injection attacks (REQUEST-942-APPLICATION-ATTACK-SQLI), and rules to protect against session fixation attacks (REQUEST-943-APPLICATION-ATTACK-SESSION-FIXATION). In addition, the data changing module 230 may generate modified web request data.

Also, the above-described risk determining module 220 and the data changing module 230 may be applied to, in addition to web data, modifying web request data, or response data in association with the modified web request data.

In addition, the second communication module 210 may transmit modified web request data to the filter unit 110.

Also, web request data, and a resulting risk of the web request data may be stored in the storage module 114.

In detail, at least one of web request data which is received in the first communication module 112 from the second communication module 210, and a resulting risk of the web request data determined in the risk determining module 220 may be stored in the storage module 114.

Also, at least one of response data received in the first communication module 112 from the second communication module 210, and a resulting risk of the response data determined in the risk determining module 220 may be stored in the storage module 114.

In addition, by using a resulting risk of web request data which is stored in the above-described the storage module 114, the first control module 111 may control the first communication module 112 to prepare for the resulting risk of the web request data.

In detail, the first control module 111 may determine whether or not a corresponding resulting risk of the web request data is stored in the storage module 114 when the first communication module 112 receives the web request data from the user terminal 1.

In addition, when the corresponding resulting risk of the web request data is stored in the storage module 114, the first control module 111 may control the first communication module 112 to prepare for the resulting risk of the web request data by using the corresponding resulting risk of the web request data.

In other words, when it is represented that blocking of the web request data is reasonable in the corresponding resulting risk of the web request data which is stored in the storage module 114, the first control module 111 may control the first communication module 112 to block the corresponding web request data.

Also, when it is represented that passing the web request data is reasonable in the corresponding resulting risk of the web request data which is stored in the storage module 114, the first control module 111 may control the first communication module 112 to transmit the corresponding web request data to the web application 120.

In addition, by using a resulting risk of response data which is stored in the above-described storage module 114, the first control module 111 may control the first communication module 112 to prepare for the resulting risk of the response data.

In detail, the first control module 111 may determine whether or not a resulting risk of corresponding response data is stored in the storage module 114 when the first communication module 112 receives the response data from the web application 120.

In addition, when the resulting risk of corresponding response data is stored in the storage module 114, the first control module 111 may control the first communication module 112 to prepare for the resulting risk of response data by using the resulting risk of corresponding response data.

In other words, when it is represented that blocking the response data is reasonable in the resulting risk of the response data which is stored in storage module 114, the first control module 111 may control the first communication module 112 to block the corresponding response data.

Also, when it is represented that passing the response data is reasonable in the resulting risk of the response data which is stored in storage module 114, the first control module 111 may control the first communication module 112 to transmit the corresponding response data to the user terminal 1.

As described above, the resulting risk of the web request data or the resulting risk of the response data are stored in the storage module 114, and thus the filter unit 110 can rapidly and accurately perform filtering for the web request data. Accordingly, there is an effect that a case where transmission and reception between the web firewall daemon 200 and the filter unit 110 is not smooth can be prepared.

In addition, the information obtaining module 113 may obtain an IP (Internet protocol) address and URL (uniform resource locator) information of the user terminal 1 that has transmitted the web request data from the web request data.

Also, the first communication module 112 may transmit the IP address and URL information of the user terminal 1 which are obtained in the information obtaining module 113 to the second communication module 210.

In addition, the risk determining module 220 may determine a risk of the web request data by analyzing the IP address and URL information of the user terminal 1 received in the second communication module 210.

Also, the risk determining module 220 may generate a request for additional information when the IP address and URL information of the user terminal 1 are not sufficient for determining the risk of the web request data.

In addition, the second communication module 210 may transmit the request for additional information to the first communication module 112.

Also, the information obtaining module 113 may obtain additional information in association with the request for additional information from the web request data.

In addition, the first communication module 112 may transmit the additional information obtained from the web request data by the information obtaining module 113 to the second communication module 210.

Also, the risk determining module 220 may analyze the additional information received in the second communication module 210 from the first communication module 112, and determine the risk of the web request data.

In addition, the second communication module 210 may transmit to the first communication module 112 the resulting risk of the web request data which is determined by analyzing the additional information by the risk determining module 220.

Figure 4:
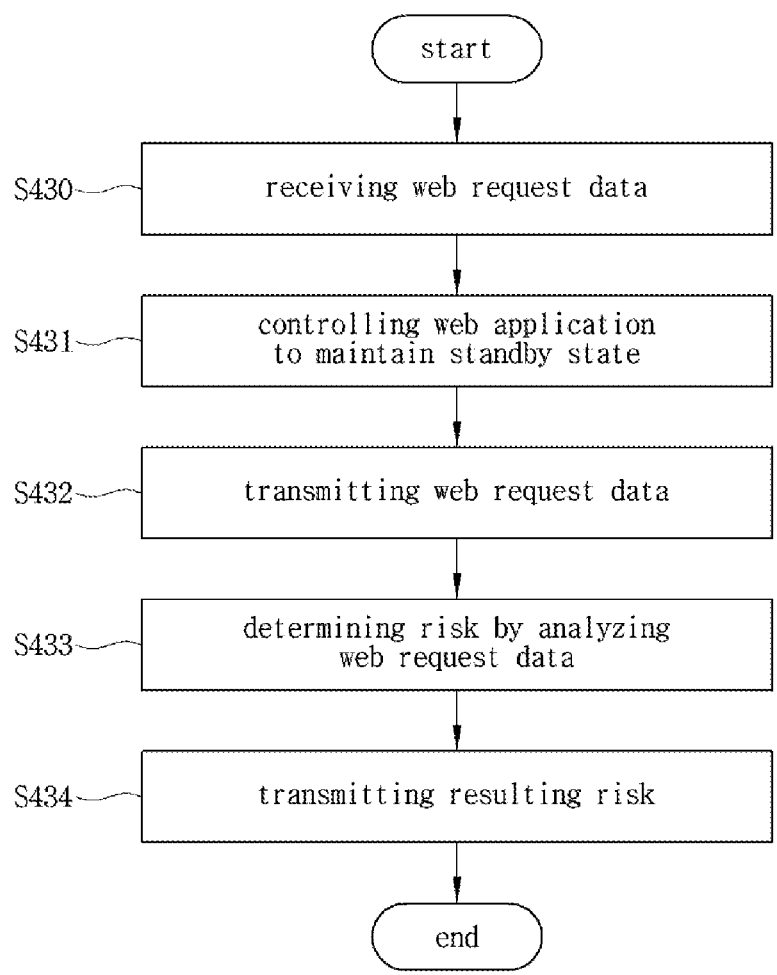
FIG. 4 is a view showing a schematic flow of a web attack detection and blocking method according to an embodiment of the present invention.

FIG. 4 is a view showing a schematic flow of a web attack detection and blocking method according to an embodiment of the present invention.

Referring to FIG. 4, in 5430, the filter unit 110 may receive web request data from the user terminal 1.

Subsequently, in 5431, the filter unit 110 may control the web application 120 to maintain a standby state.

Subsequently, in 5432, the filter unit 110 may transmit the web request data to the web firewall daemon 200.

The filter unit 110 may obtain an IP address and URL information of the user terminal 1 that has transmitted the web request data.

Subsequently, the filter unit 110 may transmit the obtained IP address and the URL information of the user terminal 1 to the web firewall daemon 200.

Also, the web firewall daemon 200 may determine a risk of the web request data by analyzing the IP address and the URL information of the user terminal 1.

Subsequently, the web firewall daemon 200 may generate a request for additional information when the IP address and the URL information of the user terminal 1 are not sufficient for determining the risk of the web request data.

Also, the web firewall daemon 200 may transmit the request for additional information to the filter unit 110.

Subsequently, the filter unit 110 may obtain additional information in association with the request for additional information from the request of web data.

Also, the filter unit 110 may transmit the additional information obtained from the web request data to the web firewall daemon 200.

Subsequently, the web firewall daemon 200 may determine the risk of the web request data by analyzing the additional information.

Also, the web firewall daemon 200 may transmit the resulting risk of the web request data which is determined by analyzing the additional information to the filter unit 110.

Subsequently, in 5433, the web firewall daemon 200 may determine the risk by analyzing the web request data.

Also, the web firewall daemon 200 may modify the web request data when the web firewall daemon 200 determined that changes in the web request data are necessary according to the resulting determination.

Subsequently, the web firewall daemon 200 may generate modified web request data where the web request data is modified.

Subsequently, in web 5434, the firewall daemon 200 may transmit the resulting risk of the web request data to the filter unit 110.

Subsequently, the first control module 111 of the filter unit 110 may control the first communication module 112 of the filter unit 110 so as to prepare for the resulting risk of the web request data which is received from the web firewall daemon 200.

Also, the web firewall daemon 200 may transmit the modified web request data to the filter unit 110.

Subsequently, the filter unit 110 may store the web request data and the resulting risk of the web request data.

Subsequently, by using the stored web request data and the resulting risk of the web request data, the first control module 111 of the filter unit 110 may control the first communication module 112 of the filter unit 110 so as to prepare for the stored resulting risk of the web request data.

Configurations and operations of a web attack detection and blocking system and a method thereof according to the present invention may be employed as described above. Meanwhile, in the above description of the present invention, specific embodiments have been described, but various modifications may be made without departing from the scope of the present invention.

Although the present invention has been described with reference to the limited embodiments and the drawings, the present invention is not limited thereto, and various modifications and changes can be made by those skilled in the art to which the present invention pertains.

Those skilled in the art will appreciate that the present invention may be embodied in a modified form without departing from the essential characteristics of the above-described substrate. Therefore the embodiments described above would be considered in a descriptive way, not in a limitative way. The scope of the present invention is shown in the claims rather than the foregoing description, and all differences within the scope will be construed as being included in the present invention.

According to a system for detecting and blocking a web attack, and a method thereof of the present invention, first, customer customized web security service without affecting the stability and availability of the web application can be provided, web security service regardless of an Internet network situation can be provided, easy installation, update, and version upgrade on software can be provided, security services while maintaining an existing network configuration can be provided, security services without changing IP and DNS information can be provided, an SSL authentication and a personal key can be prevented from being exposed and the initial cost of introduction can be reduced, application to a cloud server environment in a smooth manner can be available, and application to a web application security system, a web server installed in a cloud system, an end point of a mobile application server side, an end point of an IOT user interface, and an end point of a server side can be available.

A system for detecting and blocking a web attack, and a method thereof providing the above various effects can have a positive impact on the software and security solutions industries and can be used in many ways.

The invention claimed is:

1. A system for detecting and blocking a web attack, the system comprising:
   a hardware processor configured to perform an operation of a filter unit and a web firewall daemon;
   the filter unit receiving web request data from a user terminal, and controlling a web application to maintain a standby state; and
   the web firewall daemon receiving the web request data from the filter unit, and determining a risk by analyzing the web request data and transmitting the resulting risk of the web request data to the filtering unit,
   wherein the filtering unit includes:
      a first communication module performing communication with the web firewall daemon by using the same protocol, and receiving the resulting risk of the web request data from the web firewall daemon; and
      a first control module controlling the first communication module to prepare for the resulting risk of the web request data;
   wherein the web firewall daemon includes:
      a second communication module receiving the web request data from the filtering unit;
      a risk determining module determining the risk by analyzing the web request data received in the second communication module; and a data changing module modifying the web request data when it is determined that the resulting risk of the web request data represents that changes in the web request data are necessary so as to generate a modified web request data,
wherein the second communication module transmits the modified web request data to the filtering unit;
wherein the filtering unit further includes: an information obtaining module obtaining an IP (Internet protocol) address and URL (uniform resource locator) information of the user terminal that has transmitted the web request data from the web request data;
wherein the first communication module transmits to the second communication module the IP address and the URL information of the user terminal, the IP address and the URL information being obtained in the information obtaining module;
the risk determining module determines the risk of the web request data by analyzing the IP address and the URL information of the user terminal, the IP address and the URL information being received in the second communication module, and when it is determined that the IP address and the URL information of the user terminal are not sufficient for determining the risk of the web request data, the risk determining module generates a request for additional information; and
the second communication module transmits the request for additional information to the first communication module; and
wherein the information obtaining module obtains additional information in association with the request for additional information from the web request data;
the first communication module transmits the additional information obtained in the information obtaining module from the web request data to the second communication module;
the risk determining module determines the risk of the web request data by analyzing the additional information received in the second communication module; and
the second communication module transmits the resulting risk of the web request data to the first communication module which is obtained by analyzing the additional information in the risk determining module.

2. The system of claim 1, wherein the filtering unit further includes: a storage module for storing the web request data and the resulting risk of the web request data,
wherein the first control module controls the first communication module to prepare for the resulting risk of the web request data by using the resulting risk of the web request data stored in the storage module.

3. A method of detecting and blocking a web attack, the method comprising:
receiving, by a filtering unit, web request data from a user terminal;
controlling, by the filtering unit, a web application to maintain a standby state;
transmitting, by the filtering unit, the web request data to a web firewall daemon;
determining, by the web firewall daemon, a risk by analyzing the web request data; and
transmitting, by the web firewall daemon, the risk of the web request data to the filtering unit,
wherein the transmitting, by the web firewall daemon, of the risk of the web request data to the filtering unit includes: controlling, by a first control module, a first communication module to prepare for the risk of the web request data which is received in the first control module from the web firewall daemon;
wherein the transmitting, by the filtering unit, of the web request data to the web firewall daemon includes:
obtaining, by the filtering unit, an IP (Internet protocol) address and URL (uniform resource locator) information of the user terminal that has transmitted the web request data;
transmitting, by the filtering unit, the obtained IP address and the URL information of the user terminal to the web firewall daemon;
determining, by the web firewall daemon, the risk of the web request data by analyzing the IP address and the URL information of the user terminal;
generating, by the web firewall daemon, a request for additional information when the IP address and the URL information of the user terminal are not sufficient for determining the risk of the web request data; and
transmitting, by the web firewall daemon, the request for additional information to the filtering unit; and
wherein the transmitting, by the web firewall daemon, of the request for additional information to the filtering unit includes:
obtaining, by the filtering unit, additional information in association with the request for additional information from the web request data;
transmitting, by the filtering unit, the additional information obtained from the web request data to the web firewall daemon;
determining, by the web firewall daemon, the risk of the web request data by analyzing the additional information; and
transmitting, by the web firewall daemon, the resulting risk of the web request data which is determined by analyzing the additional information to the filtering unit.

4. The method of claim 3, wherein the determining, by the web firewall daemon, of the risk by analyzing the web request data includes:
modifying, by the web firewall daemon, the web request data when it is determined that the resulting risk of the web request data represents that modification on the web request data is necessary; and
generating, by the web firewall daemon, modified web request data where the web request data has been modified, and
the transmitting, by the web firewall daemon, of the risk of the web request data to the filtering unit includes:
transmitting, by the web firewall daemon, the modified web request data to the filtering unit.

5. The method of claim 3, wherein the transmitting, by the web firewall daemon, of the risk of the web request data to the filtering unit includes:
storing, by the filtering unit, the web request data and the resulting risk of the web request data; and
controlling, by the first control module, the first communication module to prepare for the risk of the web request data by using the stored resulting risk of the web request data.

* * * * *